March 27, 1945.　　　F. L. COX　　　2,372,474
ATTACHMENT FOR TOBACCO TRANSPLANTERS AND THE LIKE
Filed Sept. 29, 1943　　　2 Sheets-Sheet 1

March 27, 1945.  F. L. COX  2,372,474
ATTACHMENT FOR TOBACCO TRANSPLANTERS AND THE LIKE
Filed Sept. 29, 1943  2 Sheets-Sheet 2

Inventor
F. L. Cox
By Eugene L. Stevens
Attorney

Patented Mar. 27, 1945

2,372,474

UNITED STATES PATENT OFFICE 2,372,474

ATTACHMENT FOR TOBACCO TRANSPLANTERS AND THE LIKE

Frederic L. Cox, Grifton, N. C.

Application September 29, 1943, Serial No. 504,306

10 Claims. (Cl. 97—56)

My invention relates to improvements in machines for transplanting small plants in rows and has particular reference to the planting of tobacco plants and in facilitating the operation of doing so.

Present practice in tobacco plant planting, for instance, contemplates the final preparation of the ground in a more or less pulverized condition and presenting a plurality of laterally spaced rather sharply mounded rows across the field. These mounded rows are prepared to receive the tobacco plants in spaced lineal series and difficulty has been experienced in the proper disposition of the plants, particularly as to protection and depth because said mounded rows present more or less sharply defined cross-sectional apices.

It is therefore the primary object of the present invention to provide means for removing the upper portions of said mounded rows so as to provide a substantially plane lineal planting space of considerable cross-sectional area to the end that the plants may be efficiently planted at proper depth with an adequate amount of sustaining soil at each side of same. In this connection it will be understood that the removed upper portions of the previously more or less sharply mounded rows will be deposited at either side thereof to give the same greater cross-sectional thickness.

Another object of the invention is to furnish an attachment for the purpose specified which is not only adjustable as to depth of penetration into the mounds and readily maintained in a set position; but which may be readily attached to the various types of transplanters in a few minutes without the exercise or more than ordinary mechanical skill.

Still another object of the invention is to provide a device as characterized which is of simple and inexpensive construction and susceptible for the most part, if need be, of manufacture from materials other than metal.

Still a further important feature of the invention has to do with the provision of spaced leading wheels in combination with a transplanter having the features aforenoted, said leading wheels being adapted to travel on opposite sides of one of said mounded rows, so as to avoid compacting same.

Various other objects and advantages of the invention reside in detailed features of construction, combination, and arrangement of the several parts—all of which will be readily understood and appreciated by those skilled in the art upon reference to the accompanying drawings in connection with the following description.

It is to be understood that the drawings disclose simply the now preferred example of the invention. It will be obvious, however, that various changes and modifications may be made in the illustrated disclosure of the invention to produce other mechanical expressions thereof without, however, departing from the spirit and scope of the inventive subject matter as claimed hereinafter. The same reference characters have been used to designate the same parts in the several views shown in the drawings in which—

Figure 1:
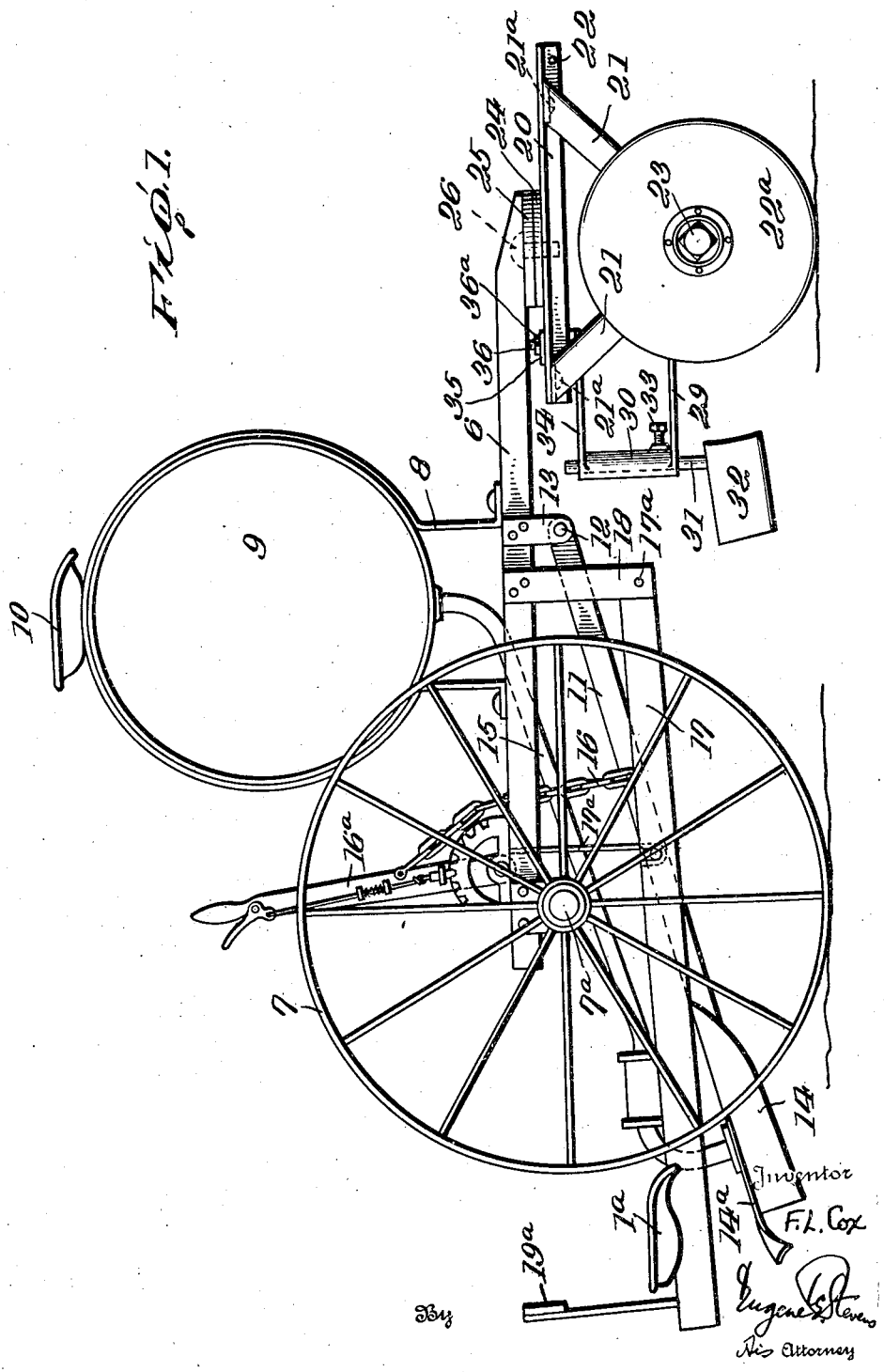
Figure 1 is a side elevational view of a well-known type of transplanter incorporating my invention, various elements of the transplanter having been deleted.
Figure 2:
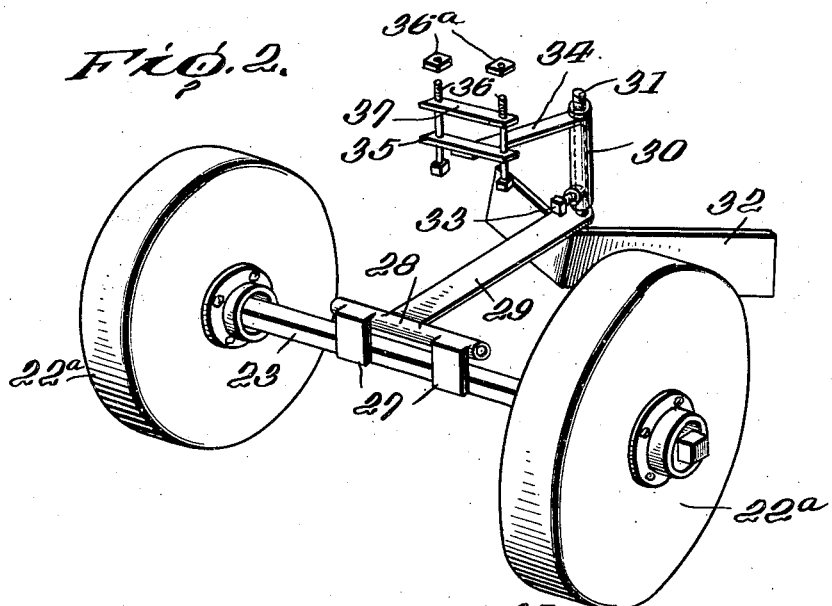
Figure 2 is a perspective view of the front leading wheel-providing truck removed with my novel attachment applied thereto.
Figure 3:
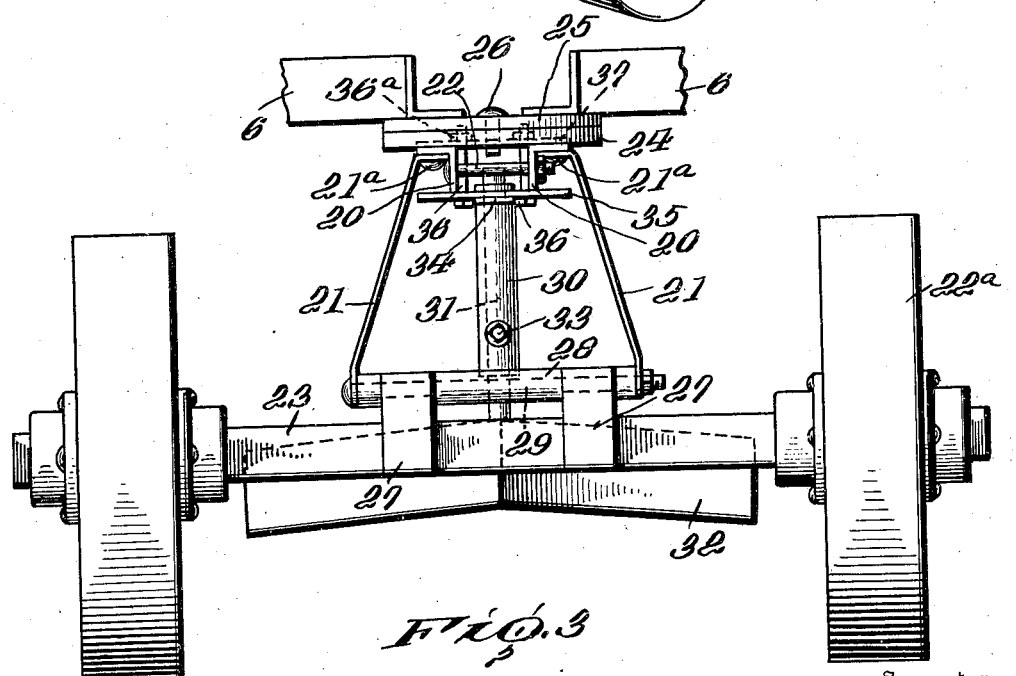
Figure 3 is a fragmentary front elevational view of the transplanter of Figure 1, illustrating the application of my novel attachment thereto.

Referring to the drawings by reference characters, and with particular reference to Fig. 1, the conventional transplanter therein shown comprehends the usual V-shaped frame 6, to the rearwardly spread side portions of which is mounted, in the usual manner, the axle 7a whose ends carry the ground-engaging wheels 7.

Mounted crosswise on the frame 6 and secured thereto by means of supporting brackets 8 is the water containing cask or tank 9, said tank being disposed in advance of the axle 7a as shown in Fig. 1. The seat 10 is secured on top of the tank as indicated. The foot rest and various control levers which have nothing to do with the present invention have been deleted.

A pair of rearwardly extending beams 11 have their forward ends pivoted as at 12 to brackets 13 which are secured in any preferred manner, as usual, to the side members of the frame 6 adjacent the truck 20 which carries the spaced leading wheels 22a. The beams 11 are substantially parallel, as usual, and their rear ends carry the furrow-opener 14 which has the conventional covering plates 14a. In accordance with the usual practice a valve controlled water outlet pipe 15 has discharge connection with the furrow-opener 14. Elevation of the furrow-opener 14 is controlled as usual by the adjustable lever 16a through the chain 16 which is connected to one or both of the furrow-opener supporting beams 11.

By way of better identification of a typical transplanter, it might be mentioned that divergent bars 17 are pivoted as at 17a to brackets 18 and carry adjacent their ends the seats 19 and back-rests 19a for the persons who actually see to the disposition of the plants in the soil. Such seats 19, as will be noted, are located just rearwardly of the furrow-opener 14 which is, of course, disposed intermediate the rear ends of the arms of frame 6 in accordance with any standard practice. The seat-carrying bars 17 are conventionally supported from the side members of the frame 6 by means of hooked hangers 17a as illustrated.

Coming now to the invention presented herein, it will be noted that the front end of the frame 6, instead of being supported by a single wheel is supported by a pair of spaced wheels 22a adapted to be disposed on either side of the lineal plant-receiving mound aforementioned. These wheels 22a are journalled on the ends of the axle 23 which is carried by the downwardly converging ends of the front truck arms 21 whose upper inturned ends are secured as at 21a to the horizontal flanges of the spaced angle bars 20 of said truck. The vertical flanges of angle bars 20 of said truck are connected by tie-bolts 22; and said bars also carry the fifth wheel 24 which is affixed thereto and cooperates with the juxtapositioned companion bearing 25 which is carried by the frame 6 at the forward vortex portion thereof. A king bolt 26 provides a pivot connection extending through the members 24, 25 to pivotally connect the twin wheeled front truck to the frame 6. It is particularly to be noted that the members 24, 25 space the angle bar members 20 of said front truck below the plane of the lower portion of the converging members of frame 6. This is so as to leave clearance for the attachment of my novel means for removing the upper portions of the aforesaid mounded rows.

As illustrated in the drawings the axle 23 provides the spaced upstanding bearings 27 in which are journalled the ends of a shaft 28 whose intermediate portion has welded or otherwise affixed thereto the rearwardly extending arm 29 whose rear end is welded to, or otherwise supports, the upstanding sleeve 30, at its lower end.

Sleeve 30 is open at its lower end to slidably receive the rod 31 which is of greater length than the sleeve and has welded, or otherwise secured thereto, the forwardly directed V-shaped mound levelling member 32, which is of considerable vertical height. The purpose of this latter will be more fully understood when it is explained that the member 32 may be required to operate upon a plant receiving mound at relatively great depths.

Sleeve 30 provides a threaded bearing within which works the binding screw 33 for securing the rod 31 in a predetermined set position.

Appropriately secured adjacent to the upper end of sleeve 30 is the forwardly extending strip 34 whose forward end carries the transverse plate 35 having adjacent its outer end the openings within which work the bolts 36 whose upper ends extend through corresponding openings in the plate 37 and receive nuts 36a. Bolts 36 serve to clamp the plates 35, 37 against the lower and upper portions, respectively, of the angle bars 20 and in this manner function to rigidly anchor the upper portion of sleeve 30 to the front wheel truck.

From the foregoing description read in connection with the accompanying drawings it will be seen that I have provided by the spaced wheeled arrangement 22a of the forward truck not only means for straddling the mounted row in which the plants are to be disposed so as to avoid compacting the same; but have also provided means in the form of the levelling member 32 for facilitating efficient and quick inserting of the plants in said mounded rows.

Having thus described my invention, what I claim is:

1. In a transplanter having a horizontally swingable frame-carried front truck including a main body portion disposed below the plane of the frame, an axle carried by said truck, spaced mound-straddling ground-engaging supporting wheels for said truck carried by said axle, a mound-reducing member disposed rearwardly of said truck, and supporting means for said mound-reducing member carried in part by said axle and said main body portion of said truck.

2. In a transplanter having a horizontally swingable frame-carried front truck including a main body portion disposed below the plane of the frame, an axle carried by said truck, spaced mound-straddling ground-engaging supporting wheels for said truck carried by said axle, a mound-reducing member disposed rearwardly of said truck, and supporting means for said mound-reducing member detachably carried in part by said axle and said main body portion of said truck.

3. In a transplanter having a horizontally swingable frame-carried front truck including a main body portion disposed below the plane of the frame, an axle carried by said truck, spaced mound-straddling ground-engaging supporting wheels for said truck carried by said axle, a mound-reducing member disposed rearwardly of said truck, supporting means for said mound-reducing member carried in part by said axle and said main body portion of said truck, and means for vertically adjusting said mound-reducing member and for maintaining same in different vertically adjusted positions.

4. In a transplanter having a horizontally swingable frame-carried front truck including a main body portion disposed below the plane of the frame, an axle carried by said truck, spaced mound-straddling ground-engaging supporting wheels for said truck carried by said axle, a mound-reducing member disposed rearwardly of said truck, supporting means for said mound-reducing member detachably carried in part by said axle and said main body portion of said truck, and means for vertically adjusting said mound-reducing member and for maintaining same in different vertically adjusted positions.

5. In a transplanter having a horizontally swingable frame-carried front truck including a main body portion disposed below the plane of the frame, an axle carried by said truck, spaced mound-straddling ground-engaging supporting wheels for said truck carried by said axle, a mound-reducing member disposed rearwardly of said truck, a vertically disposed rod to which said mound-reducing member is attached, a sleeve slidably receiving said rod, sleeve-carried means for maintaining said rod in a set position, and forwardly extending top and bottom supports for said sleeve secured to said main truck body portion and to said axle, respectively.

6. In a transplanter having a horizontally swingable frame-carried front truck including a main body portion disposed below the plane of the frame, an axle carried by said truck, spaced mound-straddling ground-engaging supporting wheels for said truck carried by said axle, a mound-reducing member disposed rearwardly of said truck, a vertically disposed rod to which said mound-reducing member is attached, a sleeve slidably receiving said rod, sleeve-carried means for maintaining said rod in a set position, forwardly extending top and bottom supports for said sleeve, and clamp-like means detachably connecting said supports to said axle and main front truck body, respectively.

7. In a transplanter having a horizontally swingable frame-carried front truck including a main body portion disposed below the plane of the frame, an axle carried by said truck, ground-engaging wheel means carried by said axle, a mound-reducing member disposed rearwardly of said truck, a vertically disposed rod to which said mound-reducing member is attached, a sleeve slidably receiving said rod, sleeve-carried means for maintaining said rod in a set position, and forwardly extending top and bottom supports for said sleeve secured to said main truck body portion and to said axle, respectively.

8. In a transplanter including a frame, a horizontally swingable frame-carried front truck having an upper bearing-providing portion, a vertically spaced subjacent wheel-carrying axle carried by said bearing-providing truck portion, a mound-reducing member at one side of said axle below the plane of said bearing-providing portion, and separate means carried by said mound-reducing member and connected, respectively, to said axle, and the bearing-providing portion of the truck.

9. In a transplanter including a frame, a horizontally swingable frame-carried front truck having an upper bearing-providing portion, a vertically spaced subjacent wheel-carrying axle carried by said bearing-providing truck portion, a mound-reducing member rearwardly of said axle below the plane of said bearing-providing portion, and separate means carried by said mound-reducing member and detachably connected, respectively, to said axle and the bearing-providing portion of the truck.

10. In a transplanter including a frame, a horizontally swingable front truck having an upper bearing-providing portion, a vertically spaced subjacent wheel-carrying axle carried by said bearing-providing truck portion, spaced row-straddling wheels journalled on said axle, a mound-reducing member in the form of a horizontally disposed wedge disposed intermediate the lines of said wheels rearwardly of said axle below the plane of said bearing-providing truck portion, a vertically disposed rod to which said mound-reducing member is attached, a sleeve slidably receiving said rod, sleeve-carried means for maintaining said rod in a set position whereby to dispose said mound-reducing member in predetermined vertical adjustment, spaced carrying arms secured to said sleeve and means adjacent the outer ends of said arms and detachably connecting the same to said axle and bearing-providing portion, respectively.

FREDERIC L. COX.